United States Patent [19]

Migrin et al.

[11] 4,136,565

[45] Jan. 30, 1979

[54] VARIABLE GEOMETRY FLUID FLOWMETER

[75] Inventors: Robert S. Migrin; Jerry A. Olson, both of Dearborn, Mich.

[73] Assignee: Eaton Corporation, Cleveland, Ohio

[21] Appl. No.: 898,267

[22] Filed: Apr. 20, 1978

[51] Int. Cl.$^2$ ............................ G01F 1/44; G01F 1/46
[52] U.S. Cl. ............................................ 73/212; 73/213
[58] Field of Search ............... 73/194 C, 205 R, 212, 73/213, 214

[56] References Cited

U.S. PATENT DOCUMENTS

| 3,086,395 | 4/1963 | York ........................................ 73/205 |
| 3,889,536 | 6/1975 | Sylvester ................................ 73/212 |

*Primary Examiner*—Herbert Goldstein
*Attorney, Agent, or Firm*—J. Gordon Lewis

[57] ABSTRACT

A low pressure drop air flowmeter for an automotive engine is disclosed. The meter includes a main air flow passage, a relatively small venturi to receive a portion of the air flow, a pressure port for sensing stagnation pressure in the main passage, a pressure port for sensing static pressure in the throat of the venturi, and a set of swirl vanes disposed adjacent the outlet of the venturi and operative to impart a swirl to the remainder of the air in the main passage, thereby creating a reduced pressure at the venturi outlet for amplifying the pressure difference between the stagnation and static pressure without appreciably increasing the pressure drop across the flowmeter. A geometrically reconfigurable element is included in the main passage resulting in a swirl rate which increases with increasing air flow but at a decreasing rate. This characteristic results in an output pressure differential signal which varies substantially linearly with flow rate over a relatively large range of operation. The reconfigurable element can be of the iris type which varies the effective tip radius of the swirl vanes, or alternatively, can comprise flexible swirl vanes which present a variable pitch to the remainder of the air flowing in the main passage. Also disclosed is a solenoid valve having a multiple valving arrangement operative to communicate the stagnation pressure to an absolute pressure transducer in one position, to communicate the static pressure with the transducer in another position, and to communicate engine manifold vacuum pressure with the transducer in a third position. Finally, pressure relief means are disclosed which provide a path for fluid communication between the main passage and the atmosphere at a point downstream of the swirl vanes when the direction of the air flow through the meter is reversed, such as when the engine backfires.

23 Claims, 10 Drawing Figures

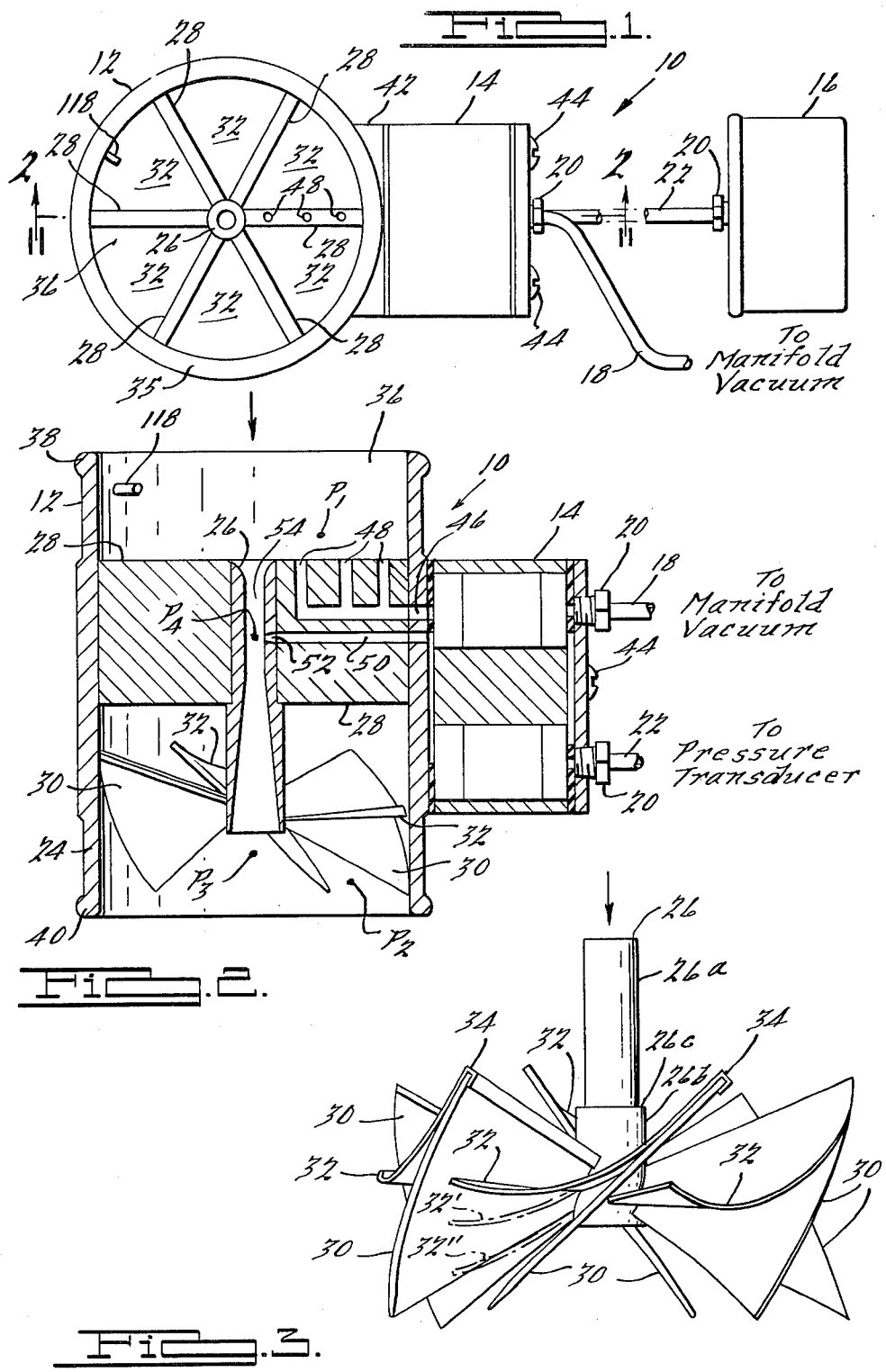

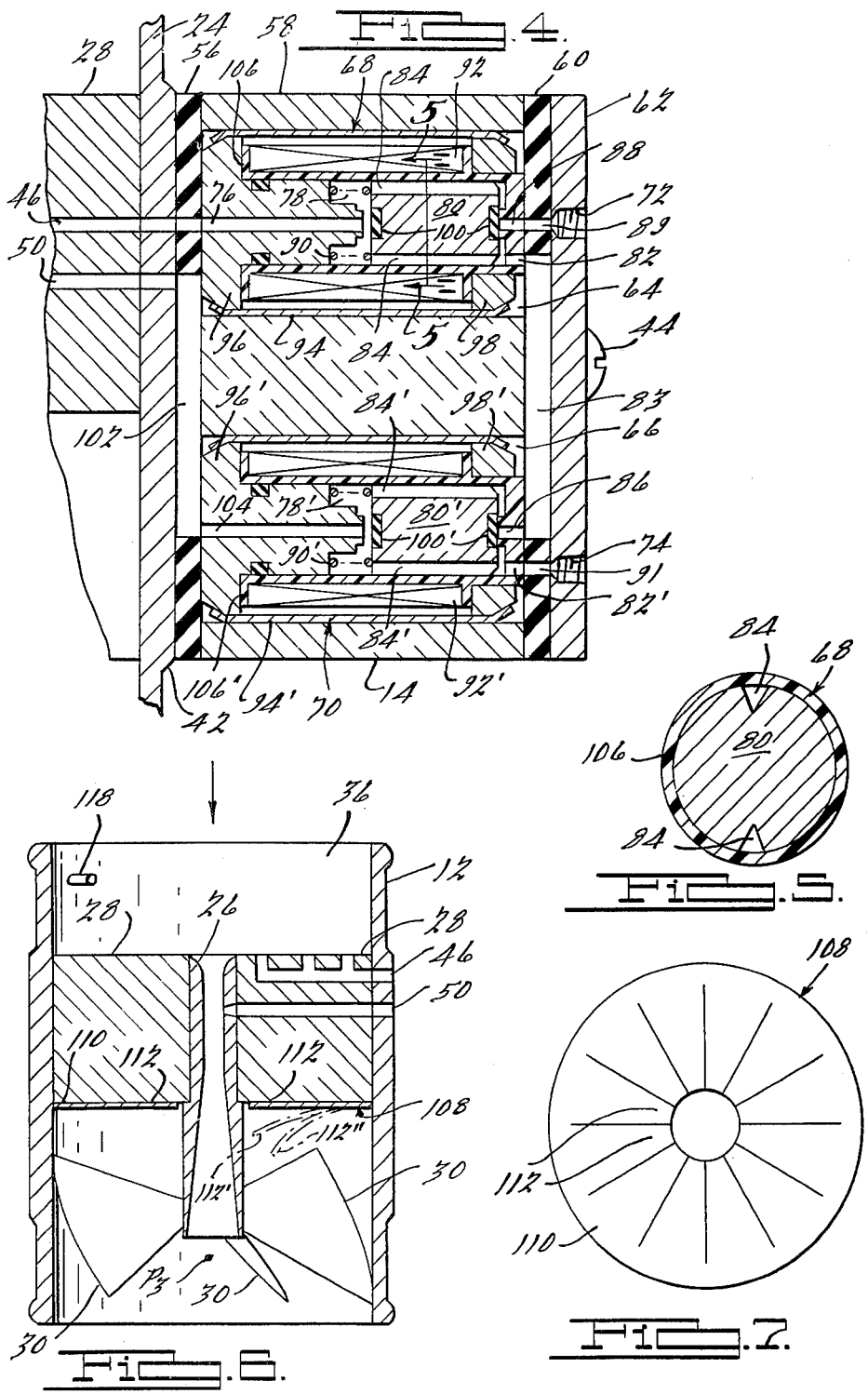

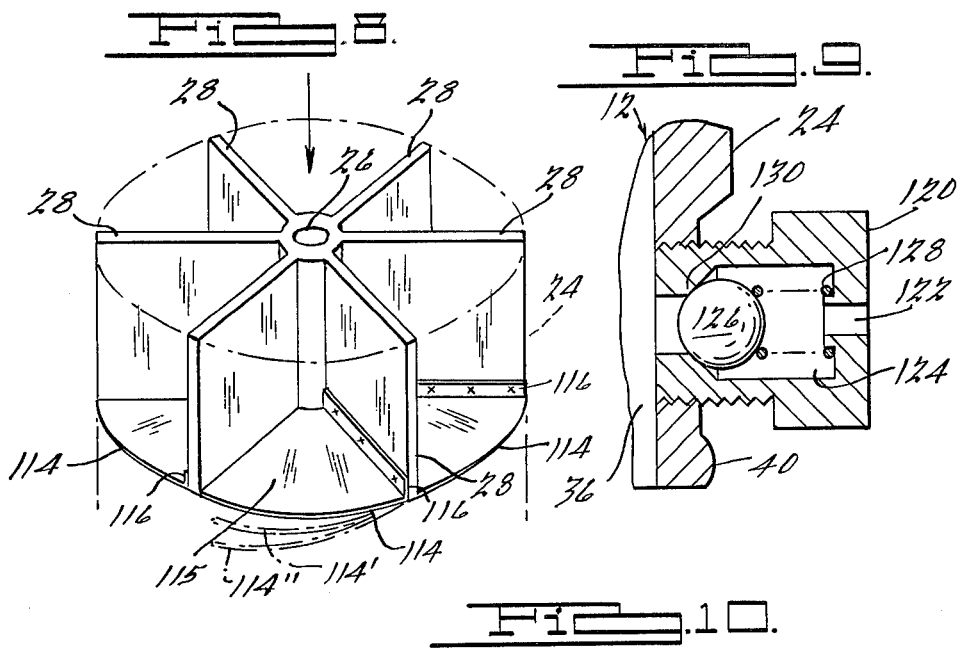
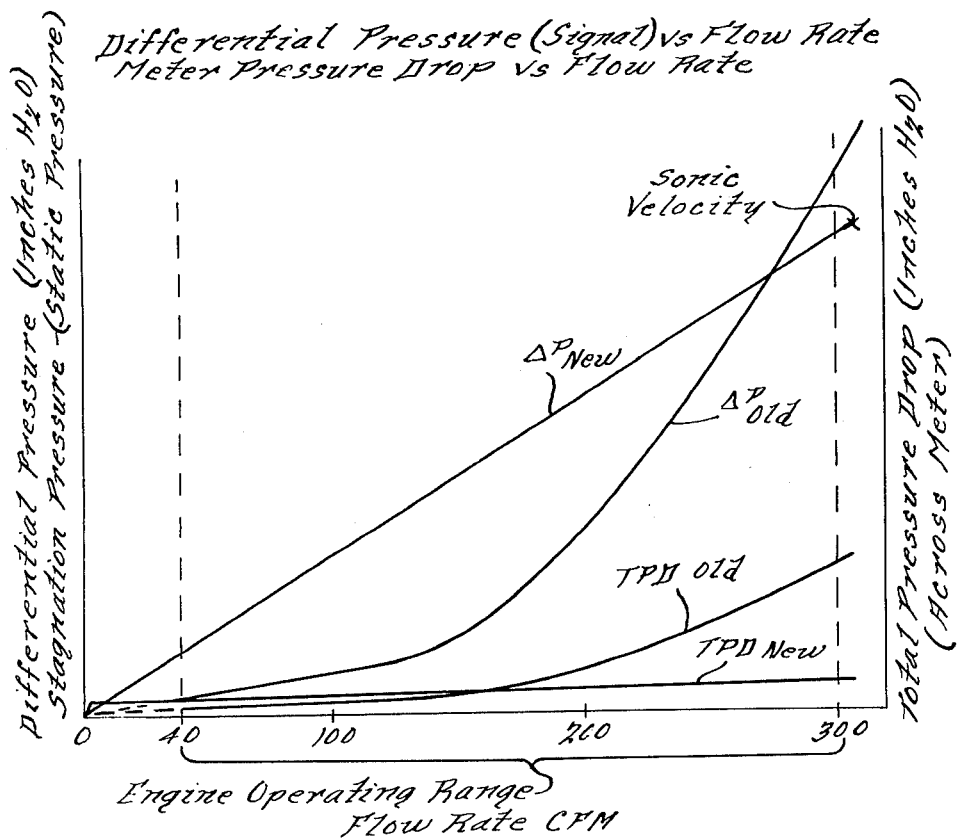

VARIABLE GEOMETRY FLUID FLOWMETER

BACKGROUND OF THE INVENTION

1. Field of the Invention

This invention relates to fluid flowmeters in general and particularly to such flowmeters designed specifically for use in automotive internal combustion engines.

2. Description of the Prior Art

Fluid flowmeters of the pressure drop or differential pressure type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e., the drop in pressure is a drop in total pressure. Venturi flowmeters are low energy loss devices relative to orifice plate flowmeters since most of the pressure drop in the venturi throat is recoverable at the venturi outlet, i.e., the drop in pressure in the throat is due to an increase in kinetic energy of the fluid. However, when either of these flowmeters are used to measure fluid flow which varies over a wide range, such as air flow to an automotive engine, they either overly restrict total air flow at high engine speeds and loads if they are sized small enough to provide an adequate differential pressure signal at low engine speeds and loads, or they provide an inadequate differential pressure signal at low engine speeds and loads if they are sized larger.

SUMMARY OF THE INVENTION

The invention disclosed herein represents an improvement of the fluid flowmeter disclosed in copending application U.S. Ser. No. 845,751 filed Oct. 26, 1977.

An object of this invention is to provide a fluid flowmeter which is low in cost, high in accuracy, and operable to provide an easily measurable pressure differential signal at low fluid flows and a low pressure drop at high fluid flows. Another object of this invention is to provide a fluid flowmeter which operates to cause the pressure differential signal to vary substantially linearly with fluid flow over an extended range of operation. Another object of this invention is to provide a fluid flowmeter which has relatively few moving parts in the flow area of the meter and is therefore durable and quick in response time. Another object of this invention is to provide a fluid flowmeter having means to amplify a pressure differential signal without appreciably increasing the total pressure drop across the entire flowmeter.

Accordingly to a feature of the invention, the flowmeter includes means for swirling a fluid flowing in a passage. The swirl means includes means operative to increase the rate of the swirl in response to increasing fluid flow and means operative to decrease the rate of such increase in response to such increasing fluid flow.

According to another feature of the invention, the flowmeter includes a main passage having a fluid flow therein, swirl means operative to swirl the fluid about a central axis defined by the passage and thereby impart a high tangential velocity vector to the fluid about the central axis for forming a low static pressure region about the central axis, means for sensing the low static pressure, and means for sensing the pressure of the fluid before the swirl means. A geometrically reconfigurable element in the main passage operates to vary the magnitude of the swirl such that it increases at a decreasing rate with increasing fluid flow.

According to another feature of the invention, the flowmeter of the above feature includes a secondary passage disposed about the central axis for communicating a portion of the fluid in the main passage upstream of the swirl means with the low pressure region.

According to another feature of the invention, the secondary passage of the above feature is a venturi tube having a throat and means for sensing the low static pressure in the throat.

According to another feature of the invention, a solenoid valve having multiple valving members operates to selectively interconnect the static pressure signal, the stagnation pressure signal, and a manifold vacuum signal with an absolute pressure transducer.

In the preferred embodiment of the invention, the geometrically reconfigurable element comprises a plurality of flexible swirl vanes which present a pitch to the fluid in the main air flow passage which increases with increasing fluid flow.

In an alternative embodiment of the invention, flexible swirl vanes as described above are combined with fixed swirl vanes which are disposed radially in the main passage at an angle oblique to the fluid flow lending structural support to the flexible vanes.

In another alternative embodiment of the invention, an iris member is disposed within the main passage immediately upstream of a set of fixed swirl vanes which effectively presents swirl vanes of varying tip radius to the fluid flowing in the main passage.

According to another feature of the invention, pressure relief means are provided downstream of the swirl vanes to form a path of fluid communication between the main passage and the atmosphere upon the reversal of fluid flow direction, such as when an engine with which the meter is associated, backfires.

Various other features and advantages of this invention will become apparent upon reading the following specification, which, along with the patent drawings, describes and discloses a preferred illustrative embodiment of the invention in detail.

The invention makes reference to the accompanying drawings.

BRIEF DESCRIPTION OF THE DRAWINGS

FIG. 1 is a plan view of a fluid flowmeter embodying the present invention illustrating its interconnection with a pressure transducer and a source of engine manifold vacuum pressure;

FIG. 2 is a cross sectional view on an enlarged scale taken on line 2—2 of FIG. 1;

FIG. 3 is a view on yet a further enlarged scale showing details of the venturi tube-swirl vane subassembly of the flowmeter seen in FIGS. 1 and 2;

FIG. 4 is a cross sectional view on an enlarged scale of the valve section of the flowmeter of FIGS. 1 and 2, illustrating the internal details thereof;

FIG. 5 is a cross sectional view taken on line 5—5 of FIG. 4;

FIG. 6 is a cross sectional view of the flowmeter section of an alternative embodiment of the invention;

FIG. 7 is a plan view of a flexible iris employed in the flowmeter section of FIG. 6;

FIG. 8 is a perspective view of the flexible swirl vanes and straightening vanes of another alternative embodiment of the invention;

FIG. 9 is a broken sectional view illustrating an optional pressure bypass relief valve for use with the flowmeter of FIGS. 1 and 2; and FIG. 10 is a pressure differential signal response graph comparing the differential pressure and total meter pressure drop versus that in prior art units, over a typical range of operation.

DETAILED DESCRIPTION OF THE SPECIFIC EMBODIMENTS

The preferred embodiment of the invention fluid flowmeter assembly 10 is illustrated in FIGS. 1 and 2. The flowmeter assembly 10 comprises a flowmeter section 12, a valve section 14, and a remote pressure transducer 16 which is in fluid communication with the valve section 14 through a pressure line 18. The flowmeter assembly 10, as disclosed, is adapted for measuring the mass air flow to an internal combustion engine. However, the flowmeter section 12, with or without valve section 14 and/or transducer 16, may be used in other environments as a mass flowmeter or a volumetric flowmeter. Additionally, the pressure transducer 16 can be mounted directly upon the valve section 14 or remotely as illustrated, depending upon the intended application. In the preferred embodiment, the line 18 is interconnected to the valve section 14 and the transducer 16 by conventional fittings 20. A second pressure line 22 interconnects the valve section 14 and the intake manifold of the engine with which the flowmeter 10 is associated. It is contemplated that line 22 could alternatively communicate with other pressure sources such as the atmosphere.

Flowmeter section 12 comprises a round walled tubular housing 24; a venturi tube 26 disposed along the central axis of housing 24 and having a lower portion 26b and a reduced diameter upper portion 26a joined to lower portion 26b by shoulder 26c; a set of six radially disposed air straightening vanes 28 fixed at their radially inner ends to the outer circumferential wall of the reduced diameter portion 26a of venturi tube 26 and at their radially outer ends to the inner circumferential wall of housing 24; and a set of six radially disposed swirl vanes 30 fixed at their radially inner ends to the outer circumferential wall of the lower portion 26b of venturi 26 at a 50° angle with respect to the air flowing parallel to the central axis. It is contemplated that this angle can be changed depending upon the application and operating characteristics of the engine with which the flowmeter assembly 10 is to be employed. In the preferred embodiment of the invention, the swirl vanes 30 depend from the lowermost end of the venturi tube 26 and extend radially outwardly substantially to the inside wall of the housing 24. The venturi tube 26 and the swirl vanes 30 are illustrated as a separate component or subassembly but it is contemplated that they could be integerly molded with the straightening vanes 28 and the housing 24 in zinc, aluminum, plastic or other suitable material. If necessitated by given design considerations, the radially outwardmost ends of the swirl vanes 30 can be fixed to the inside wall of the housing 24 for increased structural integrity. The venturi tube 26 may be replaced by a straight wall tube or a substantially straight wall tube. However, the venturi tube 26 has been found to provide a lower static pressure than the straight wall tubes, particularly when the total air flow through the flowmeter is low, and therefore provides a greater differential pressure signal.

Referring to FIG. 3, six flexible swirl vanes 32 are provided, one being fixably associated with each fixed swirl vane 30. Each flexible swirl vane 32 is fixed to the swirl vane 30 associated therewith along the uppermost edge thereof and extends from that edge in cantilever fashion. Each flexible swirl vane 32 has an arcuate section resulting in its being substantially normal to the direction of air flow through the flowmeter section 12, when in the relaxed position as illustrated. The flexible vanes 32 depend entirely from the fixed vanes 30 and project towards the next adjacent fixed vane 30 to a nearly abutting relationship, whereby, in combination, the six flexible vanes 32 substantially close the air passageway through the housing 24 with the exception of the venturi tube 26.

The flexible swirl vanes 32 are preferrably constructed from brass or stainless steel shim stock but it is contemplated that any other suitable material can be substituted. The uppermost end of each flexible vane 32 is illustrated as having a U-shaped section 34 which embraces the uppermost edge of the associated fixed vane 30. Attachment can be completed by rivets, welding, adhesives or the like. Additionally, it is contemplated that in certain applications, the flexible vanes 32 could be molded as an integral part of the fixed vanes 30.

Tapered shim stock has been found to be preferrable to flat shim stock for application in the flexible vanes 32. In fabricating the flexible vanes 32, the taper gradient is aligned substantially radially with the thickest portion being at the radially outwardmost end of the flexible vanes 32. The construction results in a characteristic radial spring constant gradient which allows the radially innermost portion of each flexible swirl vane 32 to deflect before the radially outermost portion of that vane. Thus, at low air flow rates, the effective swirl vane tip radius is reduced, thereby concentrating the air flow radially inwardly, accentuating the pressure drop at the outlet of the venturi tube 26. It is contemplated that any number of structural variations of the flexible swirl vane 32 can be empirically derived herefrom given a set of system perameters. The arrangement of swirl vanes 30 and 32 described herein are therefore intended as being illustrative only.

In application, as air passes through the flowmeter section 12 a differential pressure is developed across the flexible swirl vanes 32 causing them to deflect downwardly, ultimately approaching the pitch of the fixed vanes 30 at full air flow rating of the flowmeter 10. Thus, at relatively low air flow rates, the pressure drop across the swirl vanes 32 and thus, the meter 10 will be relatively high as opposed to fixed geometry type flowmeters. At higher flow rates, the flexible vanes 32 will be displaced downwardly, increasing the effective pitch presented by the swirl vanes 30 and 32 to the air flowing through the flowmeter section 12 with a reduced relative pressure drop. The nature of the material selected for the flexible swirl vanes 32 causes them to act as springs with the released position of the "springs" seen in solid lines in FIG. 3. FIG. 3 illustrates one of the flexible vanes 32 in phantom in two intermediate positions 32' and 32" which the vane 32 would assume with increasing air flow.

The housing 24 defines a main air flow passage 36 and includes beaded ends 38 and 40 at its inlet and outlet respectively, for connecting the housing 24 into a duct system. A boss 42 is provided for mounting the valve section 14 thereto by screws 44. A stagnation pressure passage 46 passes through the wall of the housing 24 and radially inwardly within one of the straightening vanes 28, emerging upwardly therefrom through three radially spaced stagnation pressure ports 48. Three stagnation ports 48 are employed to develop an average stagnation pressure signal. The signal is transmitted through the stagnation pressure passage 46 and into the valve section 14. A static pressure passage 50 likewise passes through the same straightening vane 28. Passage 59 passes radially inwardly through the wall of the housing 24 through vane 28 and emerges at the throat area of the venturi 26 through a conical static pressure port 52 in the wall of the venturi. The area in which the stagnation pressure is sensed is designated $P_1$ and the area in which the static pressure is sensed is designated $P_4$. The radially outer end of static pressure passage 50 is in fluid communication with the valve section 14.

Operation of flowmeter section 12 is as follows: Air enters the inlet of the main passage 36 with a given axial or transport velocity. The stagnation pressure $P_1$ of the entering air is sensed by stagnation ports 48. These ports or alternatively a single port may be disposed further upstream or external of the main passage. A portion of the air flows through the inlet of the venturi 26 and the remainder of the air flows through the straightening vanes 28; vane 28 function to remove substantially all pre-swirl in the air due to upstream conditions. When the air leaves the straightening vanes 28, it has a substantially uniform and homogeneous axial flow pattern parallel to the central axis as it enters the swirl vanes 30 and 32. The flexible swirl vanes 32 impart a tangential swirl velocity vector to the air passing thereby which varies in magnitude as a function of the air velocity. If the flexible swirl vanes 32 were absent, the fixed vanes 30 would impart a substantially 50° swirl velocity vector to the air. The magnitude of the vector varies substantially proportionally with the incoming air velocity. This is the characteristic which limits the effective operating range of a flowmeter that does not have a geometrically reconfigurable element such as the swirl vanes 32. In the preferred embodiment, as the velocity of the incoming air increases, the effective pitch, presented by the flexible vane 32 will increase and the tangential velocity vector imparted into the swirl will vary with incoming air velocity but at a decreasing rate. The axial and tangential velocity vector components of the swirl velocity form an air flow pattern (known as a forced-vortex flow) similar to a tornado which has a high velocity at the center axis and a diminishing velocity gradient radially outward from the central axis. This resulting radial velocity gradient forms an associated radial pressure gradient having a static pressure $P_2$ at the radius of mean mass flow through the main passage, and a low static pressure region $P_3$ at the central axis. The radius of mean mass flow is, understood to mean the radius at which one half of the fluid mass passes through the annular sector disposed radially outwardly therefrom and the other half passes through the annular sector disposed radially inwardly therefrom. This low pressure accelerates the air leaving the outlet of the venturi 26 and therefore amplifies the velocity of the air flowing through the venturi 26. As a result the static pressure $P_4$ of the air of the venturi throat 52 is proportionally decreased. The total volumetric or mass air flow through the flowmeter 10 may then be calculated in a known manner by known fluid flow principles in conjunction with the expression $$P_1 - P_4 = K(P_1 - P_2)$$

wherein K is a proportionally constant. K may be empirically determined.

The static pressure $P_4$ in the venturi throat 52 is directly related to the total air flow through the meter 10 since the amount of air flowing through the venturi 26 is directly related to the low static pressure $P_3$ produced by the swirl vanes 32. Hence, the disclosed flowmeter 10 does not depend upon or use localized air flow techniques to measure air flow, which localized air flow in some modes of operation may be far from representative of the total air flow through a meter.

Valve section 14, which is shown in greater detail in FIG. 4, includes a gasket 56 disposed intermediate a puck-shaped housing 58 and the wall of housing 24. A second gasket 60 is disposed intermediate the puck-shaped housing 58 and cover plate 62. The gaskets 56 and 60, housing 58 and cover plate 62 are held together by the screws 44 which pass therethrough and threadably engage the boss 42. The housing 58 has two axially disposed bores 64 and 66 therein. The bores 64 and 66 are substantially closed at one end by gasket 56 and at the other end by gasket 60. Solenoids 68 and 70 are disposed in the bores 64 and 66 respectively. Threaded ports 72 and 74 are provided in the cover plate 62 coaxially with bores 64 and 66 respectively to provide fluid communication with the pressure transducer 16 and an external pressure source (such as manifold vacuum) by threadable engagement with standard fittings 20. Since solenoids 68 and 70 are identical, a detailed description of the internal construction of only one (68) will be given. It is also contemplated that other commercially available designs could be substituted.

The stagnation pressure passage 46 passes radially outwardly through the wall of the housing 24 and the gasket 56, opening into a stagnation pressure passage port 76 within the solenoid 68. The stagnation pressure port 76 opens into a central bore 78 within the solenoid 68, within which is slidably disposed a plunger 80. With the plunger 80 in the position illustrated, the stagnation pressure passage 46 is in fluid communication with an outlet passage 82 through axially aligned grooves 84 (FIG. 5) within the plunger 80. A chamber vertically elongated slot 83 within the gasket 60 provides fluid communication between solenoid 68 and an axial inlet passage 86 of the other solenoid 70. Solenoid 68 also has an axially disposed inlet passage 88 which is in fluid communication with the threaded port 72 through an aperture 89 within the gasket 60. The plunger 80 is biased to the right by means of a spring 90.

A coil 92 disposed coaxially with the plunger 80 is arranged to counteract the spring 90 when energized. The solenoid 68 has a cylindrical housing 94 and endplugs 96 and 98, all of which are constructed of ferrous material to define a magnetic path in combination with the plunger 80. The magnetic operating principles of the solenoid 68 and 80 are well known in the art and will not be elaborated upon. The coil 92 has provisions for interconnection with a source of electrical excitation (not illustrated). Again, however, the electrical theory of operation is well known in the art and will not be expanded upon here. In the relaxed position illustrated, the stagnation pressure passage port 76 is in fluid communication with the outlet passage 82 and the axial inlet passage 88 is blocked by one of two rubber seals 100 disposed within the plunger 80 coaxially with the port 76 and passage 88. When the coil 92 is energized, the plunger 80 will be displaced to the left, whereby the stagnation pressure passage port 76 is blocked by the seal 100 and the axial inlet passage 88 is placed in fluid communication with the outlet passage 82. Thus, in application, axial inlet passage 88 is in fluid communication with a source of manifold vacuum from the engine with which the flowmeter 10 is associated and, depending upon the position of the plunger 80, the stagnation pressure or alternatively the manifold vacuum pressure can be selectively monitored within the chamber 83 of the valve section 14.

The static pressure passage 50 passes through the wall of housing 24 and enters one end of a vertically elongated static pressure chamber or slot 102 within the gasket 56. The other end of the chamber 102 opens into a static pressure passage port 104 in the left hand end of the solenoid 70. Within the solenoid 70 the static pressure passage port 104 opens into a central bore 78' in the same manner as the stagnation pressure passage port 76 opens into central bore 78 within solenoid 68. With the plunger 80' in the position indicated the static pressure passage port 104 and thus, the static pressure passage 50 is in fluid communication with the ports 74 through an aperture 91 in the gasket 60. In application, the port 74 is in fluid communication with the pressure transducer 16 through the conventional fittings 20 and pressure line 22 illustrated in FIGS. 1 and 2. With the plunger 80' in the position indicated, one of the rubber seals 100' closes the axial inlet passage 86. As in the case with the solenoid 68, the coil 92' of the solenoid 70 is connected with a source of electrical excitation (not shown) whereby the plunger 80' can be displaced to the left to close the static pressure passage port 104 with the other rubber seal 100' and interconnect the axial inlet passage 86 with an outlet passage 82' which in turn is in fluid communication with the port 74 through the aperture 91 in the gasket 60.

In the present referred application, by selectively energizing or releasing the plungers 80 and 80' of the solenoids 68 and 70 respectively the pressure transducer 16 can selectively monitor the manifold vacuum pressure, the static pressure and the stagnation pressure. When both solenoids 68 and 70 have their respective plungers 80 and 80' in the relaxed or deenergized position as illustrated, the pressure transducer 16 is in fluid communication with the throat 54 of the venturi 26 through static pressure port 52, static pressure passage 50, static pressure chamber 102, static pressure passage port 104, central bore 78', of the solenoid 70, the grooves 84' of the plunger 80', the outlet passage 82' of the solenoid 70, the aperture 91, port 74, and the pressure line 18. The manifold vacuum pressure is blocked by the rubber seal 100 in the right hand end of the plunger 80 of the solenoid 68 and the stagnation pressure signal is blocked by the right hand end seal 100' in the plunger 80' of the solenoid 70.

To interconnect the stagnation pressure passage 46 with the pressure transducer 16, the coil 92' of the solenoid 70 must be energized so that the static pressure passage port 104 is blocked by the rubber seal 100' in the left hand end of the plunger 80' of the solenoid 70 and the axial inlet passage 86 is placed in fluid communication with the outlet passage 82' of the solenoid 70. To place the pressure transducer 16 in fluid communication with the manifold of the engine with which the flowmeter 10 is associated, both solenoids 68 and 70 must be energized whereby the seals 100 and 100' in the left hand ends of the plungers 80 and 80' respectively block the stagnation pressure passage 56 and static pressure passage 50 respectively, permitting fluid communication between the ports 72 and 74 within the valve section 14. It is contemplated that other pressure sources can be monitored in a similar fashion by extending the operation of the valve section 14 in ways which would be obvious to one skilled in the art in light of this specification. Fewer or more solenoids could be employed in such modifications. The illustrated configuration is intended for example only and it is contemplated that any number of variations could be made therefrom without offending the spirit of the present invention.

A non-conducting coil spool 106 and 106' is employed in each solenoid 68 and 70 respectively to support the coil 92 and 92' and guide plunger 80 and 80'. FIG. 5 is a cross sectional view of the plunger 80 and coil spool 106 illustrating the interfit between the two and the configuration of the grooves 84 within the plunger 80.

Referring to FIGS. 6 and 7 an alternative embodiment of the flowmeter section 12 is illustrated. The swirl vanes 30 are fixed. A flexible iris 108 is disposed within the air flow passage 36 within the flowmeter section 12 substantially normal to the central axis thereof. The iris 108 is constructed of stainless steel shim stock or the like and comprises a peripheral supportive portion 110 and a plurality of radially inwardly projecting compliant members 112 depending from support portion 110. The compliant members 112 are illustrated as being integral with the support portion 110. However, it is contemplated that separate members could be employed. The flexible iris 108 is supportively affixed to the bottom most surface of the straightening vanes 28. In operation, at relatively low air flow rates, the air passing through the air flow passage 36 passes either through the venturi tube 26 or the straightening vanes 28 and the swirl vanes 30. The air passing through the straightening vanes 28 initially is obstructed by the compliant members 112 of the flexible iris 108. Compliant members 112 are disposed substantially normal to the air flow. The air passing through the straightening vanes 28 is concentrated radially inwardly, thereby substantially increasing the velocity of the air near the exit of the venturi 26. As was described in the detailed description of the preferred embodiment illustrated in FIGS. 1, 2, and 3, this increased velocity results in a decreased pressure $P_3$ which, at low air flow rates, amplifies the pressure differential sensed in the venturi 26. As the air flow rate through the air flow passage 36 increases, the radially innermost ends of the of the compliant members 112 are deflected downwardly thereby exposing a larger radius of the swirl vanes 30 to the air stream in the main passage 36. The fixed angle of the swirl vanes 30 will impart a tangential velocity vector to the air stream thereby causing the swirl as was described in the discussion of the preferred embodiment. As the air flow rate increases the iris 108 will effectively open radially outwardly to expose a larger portion of the swirl vanes 30 to that portion of the air flow through the straightening vanes 28. This increase of effective tip diameter of the swirl vanes 30, which is proportional with air flow rate, results in a tengential flow vector which increases in magnitude with increasing air flow rate but at a decreasing rate. The compliant members 112 of the iris 108 are illustrated in phantom in several intermediate positions 112' and 112".

Referring to FIG. 8 a second alternative embodiment of the invention is illustrated, in which the plurality of flexible swirl vanes 114 depend from the lowermost edge of the straightening vanes 28, and in the relaxed position or zero air flow position, are disposed normally thereto to present a surface substantially normal to the air flowing through the straightening vanes 28. In the rest position, the swirl vanes 114 substantially close the arcuate sectors 115 defined by each pair of adjacent straightening vanes 28. At low air flow rates, the swirl vanes 114 assume a relatively small pitch with respect thereto, thereby imparting a large tangential vector to the air flow. As air flow increases, the swirl vanes 114 deflect downwardly to effectively increase the pitch presented to the air flowing by them whereby the tangential vector imparted to the air increases with increasing air velocity but at a decreasing rate. Vane 114 has an upturned foot portion 116 which is attached to the straightening vane 128 from which the swirl vane 114 depends. The swirl vanes 114 are constructed of shim stock or the like and are affixed to the straightening vanes 28 by riveting, welding, adhesives, or the like. It is contemplated however, that they could also alternatively be integrally molded with the straightening vanes 28.

Pressure transducer 16 may be any of several well known types. Herein, transducer 16 is an absolute pressure transducer of the type described in Society of Automotive Engineer (SAE) paper 770397 and manufactured by the Instruments Division of Bunker Remo Corporation. The trnnsducer measures the absolute stagnation and static pressures within the flowmeter as well as the manifold vacuum of the engine with which the flowmeter is associated, and produces electrical output signals representative of each pressure. These signals may be processed by an electronic logic system to produce a signal representative of the volumetric air flow through the flowmeter or, since the stagnation pressure is compared with absolute pressure, the signals may be processed with an absolute air temperature signal provided by a tmmperature sensor 118 in the inlet of the main air passage 36 to produce a signal representative of mass air flow through the flowmeter 10.

Referring to FIG. 9, inasmuch as each of the embodiments of the present invention described herein substantially obstruct the air flow passage 36 at low air flow rates, and the materials used in the geometrically reconfigurable elements 32, 112, and 114 is relatively thin and sensitive to rapid pressure changes, it is desirable to provide a pressure release feature to the flowmeter 10 to provide for the contingency where the engine with which the flowmeter 10 is associated backfires or otherwise causes the flow of air to severely reverse direction. The preferred embodiment of the invention is the most sensitive to such a condition inasmuch as the flexible swirl vanes 32 are nearly aligned with the next adjacent fixed swirl vane 30. Referring to FIG. 3, of the air flow direction were reversed, the flexible swirl vane 32 would tend to be displaced upwardly. However, the free ends of the flexible vanes 32 would immediately abut the overlapping surface of the next adjoining fixed swirl vane 30 directly thereabove. This would substantially seal the main air flow passage 36 and if the pressure generated in the backfire were severe enough it could potentially miscalibrate the meter.

FIG. 9 illustrates a check valve 130 which threadably engages the wall of housing 24 at a point downstream of the geometrically reconfigurable element 32, 112, or 114. The check valve 120 has an axial bore 122 therethrough having an area of increased diameter 124 therealong. A substantially spherical plug member 126 is slidably disposed within the area of increased diameter 124 and is biased to the left by a spring 128. A land 130 within the check valve 120 abuts plug member 126 to define a left hand limit of travel. As illustrated, the right hand end of the axial bore 122 communicates with the atmosphere and the left hand end communicates with the air flow passage 36. Under normal conditions the passage between the two is blocked by the plug member 126. The spring 128 has a rate which is calculated so as to hold the plug 126 in the position illustrated during normal operating conditions with air flowing toward the engine in the illustrated application. If the pressure in the air flow passage 36 increases substantially, above a predetermined point, the plug member 126 will be displaced to the right thereby opening a path of communication between the air flow passage 36 and the atmosphere. When the pressure drain drops below the predetermined point, the plug member 126 will again close the line of communication between the air flow passage 36 and the atmosphere. This overpressure condition is most likely to arise in the event of engine backfire but it is contemplated that it could also occur in various other applications. It is to be understood that the check valve 120 is for illustrative purposes only and that any number of variations therefrom could be made which would serve to relieve the overpressure condition.

Referring to FIG. 10, a differential pressure versus flow rate curve and meter pressure drop versus flow rate curve for both the preferred embodiment of the present invention (new) and the prior art devices (old) which employed fixed geometry swirl means are illustrated over a typical flow rate operating range of a V-8 autombile engine. In the fixed geometry devices, the signal pressure which is the differential (P) between the stagnation pressure and the static pressure tends to have very little amplification at low flow rates and has an extremely non-linear response over a typical automobile engine flow range. By employing the variable geometry elements described in the various embodiments of the invention, the tangential vector imparted to the air flow or swirl rate varies at a rate which increases with increasing flow rate at a decreasing rate. In the prior art devices the swirl rate varied substantially linearly with increasing flow rate. Swirl vanes impart a tangential velocity vector ($V_T$) component and an axial velocity vector component ($V_A$) to the fluid in creating the swirl. The ratio $V_T/V_A$ remains constant for fixed swirl vanes but decreases with increasing flow rate when a geometrically reconfigurable element is introduced into the flowmeter. By tailoring the effective spring rate of the variable geometry elements, a substantially linear pressure signal response curve over an extended flow range can be achieved. It is contemplated that this tailoring can be extended to result in a non-linear response over an extended range to amplify the low end signal and/or attenuate the high end signal.

Similarly, the total pressure drop (TDP) of the prior art devices would tend to increase dramatically near the high end of the flow rate range for a given application. This is extremely undesirable. With a geometrically reconfiguraable device, although at low flow rates the total pressure drop is slightly higher than that of the fixed swirl vane type units, the operating characteristic of the flowmeter provides a substantially linear total pressure drop characteristic over the entire flow range of a typical automotive application resulting in a total pressure drop at maximum flow rates which is substantially smaller than that of the prior art devices.

It is to be understood that the invention has been described with reference to specific embodiments which provide the features and advantages previously described, and that such specific embodiments are susceptible of modification, as will be apparent to those skilled in the art. Accordingly, the foregoing description is not to be construed in a limiting sense.

What is claimed is:

1. In a flowmeter of the type including means for swirling a fluid flowing in a passage to create a low pressure region at the center of said swirl, means for sensing said low pressure, and means for sensing the pressure of said fluid before said swirling, the improvement wherein said swirling means comprises:
   means operative to increase the rate of said swirl in response to increasing fluid flow through said passage; and
   means operative to decrease the rate of such increase in response to such increasing fluid flow.

2. The flowmeter of claim 1, wherein said means for increasing the rate of said swirl in response to increasing fluid flow comprises at least one swirl vane radially disposed in said passage at an angle oblique to the flow direction of said fluid and said means operative to decrease the rate of such increase comprises iris means operative to vary the effective tip radius of said swirl vane.

3. The flowmeter of claim 2, wherein said iris means is disposed in said passage adjacently upstream of said swirl vane.

4. The flowmeter of claim 1, wherein said means for increasing the rate of said swirl in response to increasing fluid flow and said means operative to decrease the rate of such increase comprise at least one swirl vane radially disposed in said passage and operative to present a variable pitch to said fluid flow.

5. A flowmeter comprising:
   a main passage for the flow of a fluid therethrough and defining a central axis;
   swirl means disposed in said main passage to receive at least a portion of the fluid and including an element which is geometrically reconfigurable proportionally with the velocity of said fluid to swirl said fluid about the central axis for forming a low static pressure region, the rate of said swirl increasing at a decreasing rate with increasing fluid velocity;
   means for sensing said low static pressure; and
   means for sensing the pressure of the fluid before the swirl means.

6. The flowmeter of claim 5, further comprising a secondary passage for communicating a portion of the fluid in said main passage upstream of the swirl means with the low pressure region.

7. The flowmeter of claim 5, further comprising a secondary passage disposed about the central axis for communicating a portion of the fluid in said main passage upstream of the swirl means with the low pressure region.

8. The flowmeter of claim 7, wherein said means for sensing said low static pressure is disposed in said secondary passage.

9. The flowmeter of claim 7, wherein said secondary passage comprises a venturi tube.

10. The flowmeter of claim 7, wherein said swirl means comprises at least one swirl vane radially disposed between said secondary and main passage at an angle oblique to the flow direction of said fluid.

11. The flowmeter of claim 10, wherein said swirl means further comprises iris means operative to vary the effective tip radius of said swirl vane.

12. The flowmeter of claim 11, wherein said iris means is disposed in said main passage adjacently upstream of said swirl vane.

13. The flowmeter of claim 10, wherein said swirl vane is operative to present a variable pitch to said fluid flow.

14. The flowmeter of claim 5, further comprising an absolute transducer in fluid communication with said main passage through intermediate valve means and operative to selectively measure said static pressure and fluid pressure before the swirl means.

15. The flowmeter of claim 14, further comprising second valve means adapted for selectively interconnecting said transducer and an external source of fluid pressure.

16. In a device including a main passage for the flow of a fluid therethrough; a secondary passage disposed within and extending substantially parallel to an axis defined by said main passage, the secondary passage including an inlet for receiving a portion of the fluid flowing in said main passage; means for sensing the stagnation pressure of the fluid; means for sensing the static pressure of the fluid in the secondary passage; and means operative to receive at least a portion of the remaining fluid in said main passage and impart a velocity vector thereto tangential to said axis for creating a reduced pressure area at the outlet of said secondary passage, thereby reducing the static pressure of the fluid in the secondary passage; wherein the improvement comprises:
   at least one geometrically reconfigurable element disposed in said main passage to receive at least a portion of the fluid and operative to vary the magnitude of said tangential velocity vector as a function of the velocity of said fluid, the magnitude of said vector increasing at a decreasing rate with increasing fluid velocity.

17. The device of claim 16, wherein said means operative to impart a tangential velocity vector comprises a set of fixed swirl vanes radially disposed between said secondary and main passage at an angle oblique to the flow direction of said remaining fluid and said geometrically reconfigurable element comprises a flexible swirl vane associated with each of said fixed swirl vanes and operative to present a varying pitch to said remaining fluid.

18. The device of claim 16, wherein said means operative to impart a tangential velocity vector comprises a set of fixed swirl vanes radially disposed between said secondary and main passage at an angle oblique to the flow direction of said remaining fluid and said geometrically reconfigurable element comprises iris means disposed in said main passage adjacently upstream of said swirl vanes and operative to vary the effective tip radius of said swirl vanes.

19. In a flowmeter of the type including means for swirling a fluid flowing in a passage to create a low pressure region at the center of said swirl, means for sensing said low pressure, and means for sensing the pressure of said fluid before said swirling, the improvement comprising:
   means operative to impart an axial velocity vector component and a tangential velocity vector component to said fluid during the formation of said swirl, the ratio of said tangential component and said axial component decreasing with increasing velocity of fluid flow through said passage.

20. The flowmeter of claim 19, further comprising means for sensing said low static pressure and means for sensing the pressure before the swirl means and wherein said passage comprises a first passage.

21. The flowmeter of claim 20, further comprising a secondary passage disposed within said first passage for communicating a portion of the fluid in said main passage upstream of the swirl means with the low pressure region.

22. The flowmeter of claim 21, wherein said means for sensing said low static pressure is disposed in said secondary passage.

23. The flowmeter of claim 21, wherein said secondary passage comprises a venturi tube.

* * * * *